US012748634B2

(12) United States Patent
Zerwas et al.

(10) Patent No.: US 12,748,634 B2
(45) Date of Patent: Sep. 29, 2026

(54) AUTOMATED KUBERNETES ADAPTATION THROUGH A DIGITAL TWIN

(71) Applicant: RAKUTEN MOBILE, INC., Tokyo (JP)

(72) Inventors: Johannes Peter Donato Zerwas, Munich (DE); Patrick Michael Krämer, Munich (DE); Wolfgang Leonhard Kellerer, Munich (DE); Navidreza Asadi, Munich (DE); Razvan-Mihai Ursu, Munich (DE); Philip Rodgers, Aberdeenshire (GB); Jee Chang Leon Wong, Tokyo (JP)

(73) Assignees: RAKUTEN SYMPHONY, INC., Tokyo (JP); TECHNICAL UNIVERSITY OF MUNICH, Munich (DE)

( * ) Notice: Subject to any disclaimer, the term of this patent is extended or adjusted under 35 U.S.C. 154(b) by 488 days.

(21) Appl. No.: 18/329,086

(22) Filed: Jun. 5, 2023

(65) Prior Publication Data

US 2024/0069982 A1 Feb. 29, 2024

Related U.S. Application Data

(60) Provisional application No. 63/452,187, filed on Mar. 15, 2023, provisional application No. 63/402,658, filed on Aug. 31, 2022.

(51) Int. Cl.
*G06F 9/50* (2006.01)
*G06F 11/34* (2006.01)

(52) U.S. Cl.
CPC ............ *G06F 9/5077* (2013.01); *G06F 9/505* (2013.01); *G06F 11/3495* (2013.01)

(58) Field of Classification Search
CPC .... G06F 9/5077; G06F 9/505; G06F 11/3495; G06F 11/3006; G06F 11/3476; G06F 11/3447
See application file for complete search history.

(56) References Cited

U.S. PATENT DOCUMENTS

| | | | | |
|---|---|---|---|---|
| 11,216,261 B1 * | 1/2022 | Moyal | .................... | G06F 9/455 |
| 2021/0240517 A1 * | 8/2021 | Mohapatra | ............ | G06F 9/5027 |
| 2023/0065431 A1 * | 3/2023 | Kumar | .................... | G06F 9/445 |

* cited by examiner

*Primary Examiner* — Jorge A Chu Joy-Davila
(74) *Attorney, Agent, or Firm* — Sughrue Mion, PLLC

(57) ABSTRACT

A method of workload management in a Kubernetes (K8s) environment may include obtaining, by a digital twin (DT) representing a cluster state, performance data of at least one K8s cluster, generating, by the DT, a behavioral model based on the performance data, determining, by a horizontal pod autoscaler (HPA) controller, a HPA configuration based on the behavioral model and implementing, by an HPA of the at least one K8s cluster, the determined HPA configuration.

20 Claims, 5 Drawing Sheets

AUTOMATED KUBERNETES ADAPTATION THROUGH A DIGITAL TWIN

CROSS-REFERENCE TO RELATED APPLICATION(S)

This application is based on and claims priority to U.S. Provisional Application No. 63/402,658, filed on Aug. 31, 2022, and U.S. Provisional Application No. 63/452,187, filed on Mar. 15, 2023 in the United States Patent and Trademark Office, the disclosures of which are incorporated herein by reference in their entireties.

BACKGROUND

1. Field

Apparatuses and methods consistent with example embodiments of the present disclosure relate to systems and methods for managing workloads in Kubernetes (K8s) clusters.

2. Description of Related Art

In related art, modern networks such as 5$^{th}$ generation (5G) cloud-native cores, become distributed service meshes, running containerized on top of Kubernetes (K8) clusters. K8s may employ a horizontal pod autoscaler (HPA) to realize scalable service management. The HPA may monitor a predefined metric, such as central processing unit (CPU) utilization in different pods, and may attempt to adaptively comply with a Quality of Service (QoS) required by adding or removing pods, while avoiding over-provisioning. The HPA may be configured to optimize the frequency of checking conditions to scale, and the utilization thresholds at which the HPA scales. If the workload varies (e.g., the application's resource requirements) or the arrival patterns of the requests change, HPA settings are likely to become invalid.

Verifying existing settings and identifying new settings presents a challenge. The operator requires knowledge of the requests patterns (e.g., how requests arrive over time) as well as the resource profile of the application (e.g., how resource demands change with the pattern). These may only be obtained empirically, and this does not directly translate into HPA settings. Thus, obtaining the necessary information and translating the information into an HPA setting is time-consuming and tedious.

SUMMARY

According to embodiments, systems and methods are provided for workload management in a Kubernetes (K8s) environment.

According to an aspect of the disclosure, a method of workload management in a K8s environment may include obtaining, by a digital twin (DT) representing a cluster state, performance data of at least one K8s cluster, generating, by the DT, a behavioral model based on the performance data, determining, by a horizontal pod autoscaler (HPA) controller, a HPA configuration based on the behavioral model and implementing, by an HPA of the at least one K8s cluster, the determined HPA configuration.

According to an aspect of the disclosure, a non-transitory computer-readable storage medium may store instructions that, when executed by at least one processor, cause the at least one processor to obtain, by a DT representing a cluster state, performance data of at least one K8s cluster, generate, by a simulation generator, at least one HPA configuration based on the behavioral model, determine, by a HPA controller, a HPA configuration based on the behavioral model, and implement, by an HPA of the at least one K8s cluster, the determined HPA configuration.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
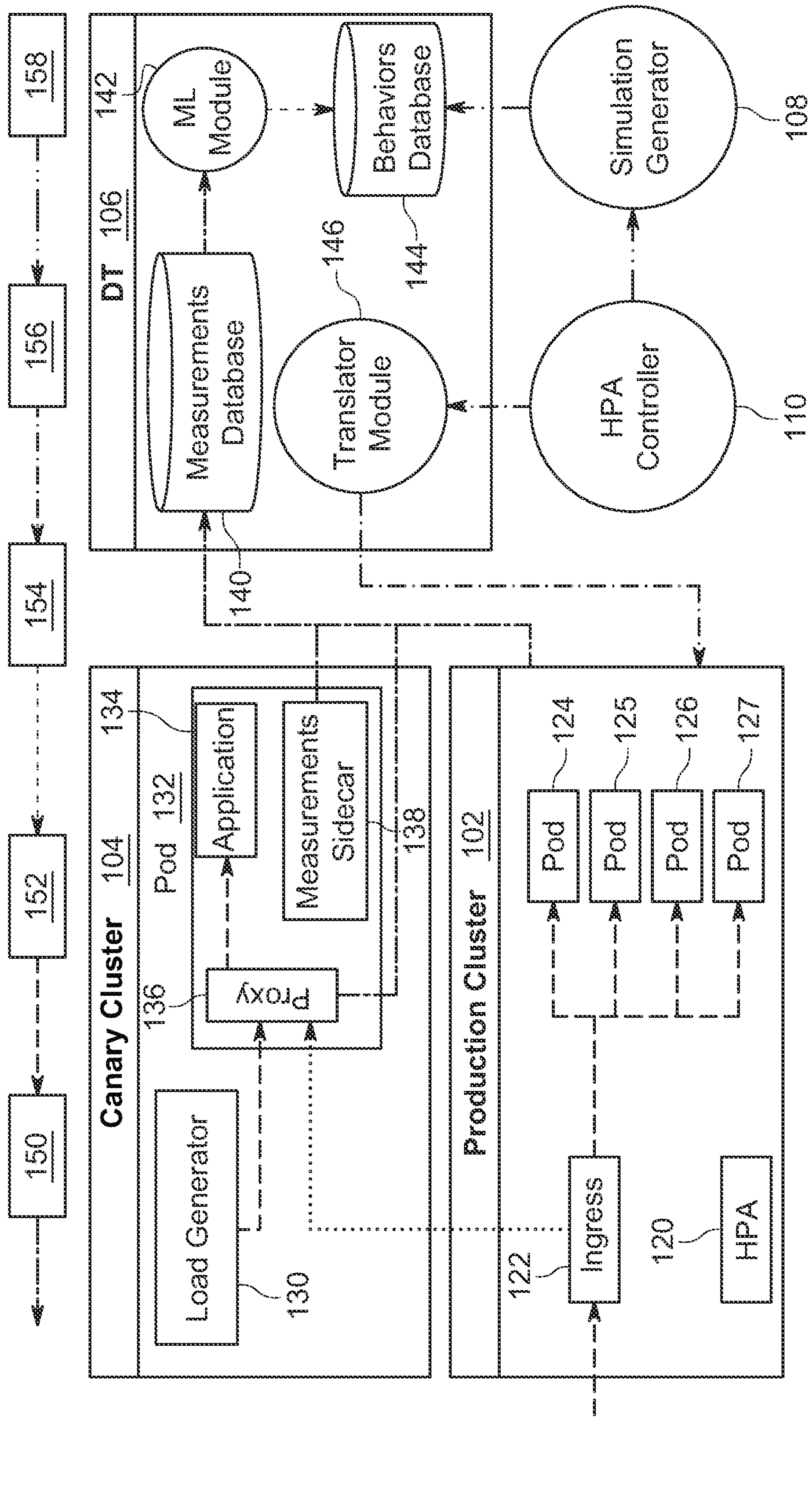
FIG. 1 is a diagram of a system for workload management in a Kubernetes (K8s) environment, according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Managing the clusters in a dynamic environment requires a high degree of automation. Automation presents challenges. That is, for example, adjusting configurations requires an understanding of how the cluster may respond to changes. While the information requiring how the cluster responds to changes may be predetermined, this becomes a limiting factor to the evolution of modern networks as they grow in size and become more diverse and dynamic.

Example embodiments of the present disclosure provide a method and system implementing a self-operating Kubernetes (K8s) cluster that may adaptively tune scaling policies to dynamic workloads. For example, the methods may include obtaining, by a digital twin (DT) representing a cluster state, performance data of a K8s cluster, generating, by the DT, a behavioral model based on the performance data, determining, by an horizontal pod autoscaler (HPA) controller, an HPA configuration based on the behavioral model, and implementing, by an HPA of the K8s cluster, the determined HPA configuration. The K8s cluster may include a canary cluster, and the performance data may be obtained from a sidecar container of the canary cluster, such as a reverse proxy sidecar container and a measurement sidecar container. When the K8s cluster is a canary cluster, the performance data may be obtained by obtaining an arrival time, a departure time, or a service time of a request from the reverse proxy sidecar container of the canary cluster, and/or obtaining a central processing unit (CPU) utilization corresponding to a request from a measurement sidecar container of the canary cluster. The K8s cluster may include a production cluster. When the K8s cluster is a production cluster, the performance data may be obtained by obtaining resource utilization information from a K8s cAdvisor, obtaining HPA actions of an HPA of the production cluster, and/or obtaining a deployment time of a deployed application instance (hereinafter, referred to as "pods") of the production cluster. The systems and methods may be implemented in response to detecting a change in a request pattern to the K8s cluster and/or in response to detecting a change or a scheduled change of an application of the K8s cluster.

That is, during operation, various aspects of the system may change. Example changes to the system may include changes in traffic, high-traffic events occurring, changes in request patterns, changes/updates to applications, and/or other changes throughout the system that may render previous HPA configurations inefficient or otherwise detrimental to the overall system. Additional changes may also be occur within the cluster itself.

Thus, the system may implement a DT to represent the cluster state, obtain measurements, and manage the cluster. The system may learn behavioral models of the cluster behavior by implementing machine learning (ML) techniques using the obtained performance data, and them may utilize the learned behavioral models to enhance simulations, allowing the system to autonomously search for and test HPA configurations. The simulations and ML behavioral models may replace human interfacing with the system (e.g., the HPA configurations may be autonomously and adaptively changed, rather than being preconfigured by a human based on previously obtained and/or static data). The ML behavioral models may allow the system to predict cluster utilization in response to the request arrival rate, and adjust the cluster configuration to new profiles. The system may automatically tune the configuration of the K8s built-in HPA to reduce the number of pods over time while keeping the request completion time low.

FIG. 1 is a diagram of a system for workload management in a K8s environment, according to an embodiment. The system may include a production cluster 102, a canary cluster 104, a DT 106, a simulation generator 108 and an HPA controller 110. The production cluster 102 may be configured to provide services (e.g., applications, pods, etc.).

As shown in FIG. 1, the production cluster 102 may include an HPA 120, an ingress controller 122, and a plurality of pods 124-127 corresponding to the service being provided by the production cluster 102. The ingress controller 122 may be configured to distribute requests to the pods 124-127. The production cluster 102 may include an HPA for each service being provided by production cluster 102. The HPA 120 may be configured to observe resource consumption of the requests, such as, for example, by collecting data via available application programming interfaces (APIs) and logs. That is, the HPA 120 may be configured to observe performance data corresponding to the request, such as resource utilization information from a K8s cAdvisor, HPA actions of the HPA 120, a deployment time of at least one pod (e.g., pods 124-127) of the production cluster 102, etc. Thus, the HPA 120 may be configured to manage instances based on the observed performance data.

The canary cluster 104 may include a load generator 130, and a pod 132. The pod 132 may include an application container 134, a reverse proxy sidecar container 136, and a measurement sidecar container 138. The load generator 130 may be configured to generate synthetic workloads to benchmark applications with patterns that are different from the prediction traffic. For example, the load generator 130 may be configured to synthesize specific distributions over services and generate a dataset which may be utilized as part of the data-driven modeling of the application behavior. The dataset may be utilized for subsequent data analysis tasks and ML (i.e., ML may require a variety of behaviors for accurate predictions that might rarely occur in day-to-day usage scenarios). The canary cluster 104 may be configured to obtain data which is not provided by the production cluster 102. Thus, the canary cluster 104 may run applications from the production cluster 102 in the pod 132 including the reverse proxy sidecar container 136 and the measurement sidecar container 138. The reverse proxy sidecar container 136 may be configured to obtain data such as arrival times of requests, departure times of request, and/or service times (e.g., durations) of requests. The measurement sidecar container 138 may be configured to obtain data such as CPU utilization at high resolutions (e.g., <1s). The reverse proxy sidecar container 136 and the measurement sidecar container 138 may be configured to provide the obtained data in real-time or near real-time. The pod 132 may be configured to update parameters of the application executed by the application container 134, or update the application itself, and to learn application characteristics safely before applying the updates to the production cluster 102.

Requests may originate from two sources, such as mirroring or forwarding random samples of requests from the production cluster 102, and synthetic workloads from the load generator 130. Sampling from the production cluster 102 allows the system to detect changes in request patterns (e.g., a request arrival rate or the distribution over the services). For example, when users start to access a more resource-intensive service more frequency, an update in the cluster configuration may be required or at least optimal.

The DT 106 may be configured as an interface to the production cluster 102 and the canary cluster 104. That is, the DT 106 may be configured to obtain data from the production cluster 102 and the canary cluster 104, as well as monitor and control the clusters. The DT 106 may include a measurements database 140 configured to store performance data obtained from the production cluster 102 and the canary cluster 104. The DT 106 may include an ML module 142 configured to implement ML on the performance data stored in the measurements database 140 and to extract/generate behavioral models based on the performance data. The behavioral models may describe aspects of the clusters 102/104, such as how the request arrivals affect CPU utilization, how the request arrival rate changes over time, etc. The DT 106 may include a behavior database 144 configured to store behaviors and behavioral models generated by the ML module 142. The DT 106 may include a translator module 146 configured to generate high-level commands (i.e., commands readable by an HPA) based on generated HPA configurations as is described below. The DT 106 may be configured to control the production cluster 102 via the translator module 146 by sending translation instructions in the form of commands that are translatable by the production cluster 102.

The simulation generator 108 may be configured to evaluate different configurations and estimate the impact of the configurations on resource consumption, Quality of Service (QoS) parameters, etc. The simulation generator 108 may be configured to utilize the behavioral models from the DT 106 (e.g., models stored in the behavior database 144) to mimic the cluster as closely as possible. That is, the simulation generator 108 may be configured to mimic the operation of the production cluster 102 and/or the canary cluster 104 based on the behavioral models generated by the DT 106. For example, the simulation generator 108 may exploit application profiles and typical request arrivals to simulate how a specific HPA setting affects resource consumption and QoS. Thus, generating simulations rather than implementing testbeds allows the system to concurrently evaluate multiple potential configurations for the HPA. Furthermore, generating simulations may be faster and more resource friendly.

The HPA controller 110 may be configured to search for the configurations that minimize the resources a cluster uses while satisfying QoS requirements. That is, the HPA controller 110 may be configured to use simulations generated by the simulation generator 108 to evaluate different HPA configurations and to select an optimal HPA configuration. The HPA controller 110 may determine an HPA configuration based on simulations conducted by the simulation generator 108. After determining an HPA configuration to be implemented by an HPA (e.g., the HPA 120), the HPA controller 110 may utilize the DT 106 to implement the HPA configuration. That is, the HPA controller 110 may send the determined HPA configuration to the translator module 146, and the translator module 146 may translate the HPA configuration to instructions interpretable by the HPA 120. The translated instructions may be sent to the HPA 120 by the DT 106. The system may trigger the HPA controller 110 automatically (e.g., in response to the system detecting a change in the request patterns), or through external triggers (e.g., in response to a scheduled update to the application).

As shown in FIG. 1, lines 150 may indicate a data processing flow, line 152 may indicate a request processing flow, line 154 may include a model processing flow, line 156 may indicate a control processing flow, and line 158 may indicate a usage processing flow.

Figure 2:
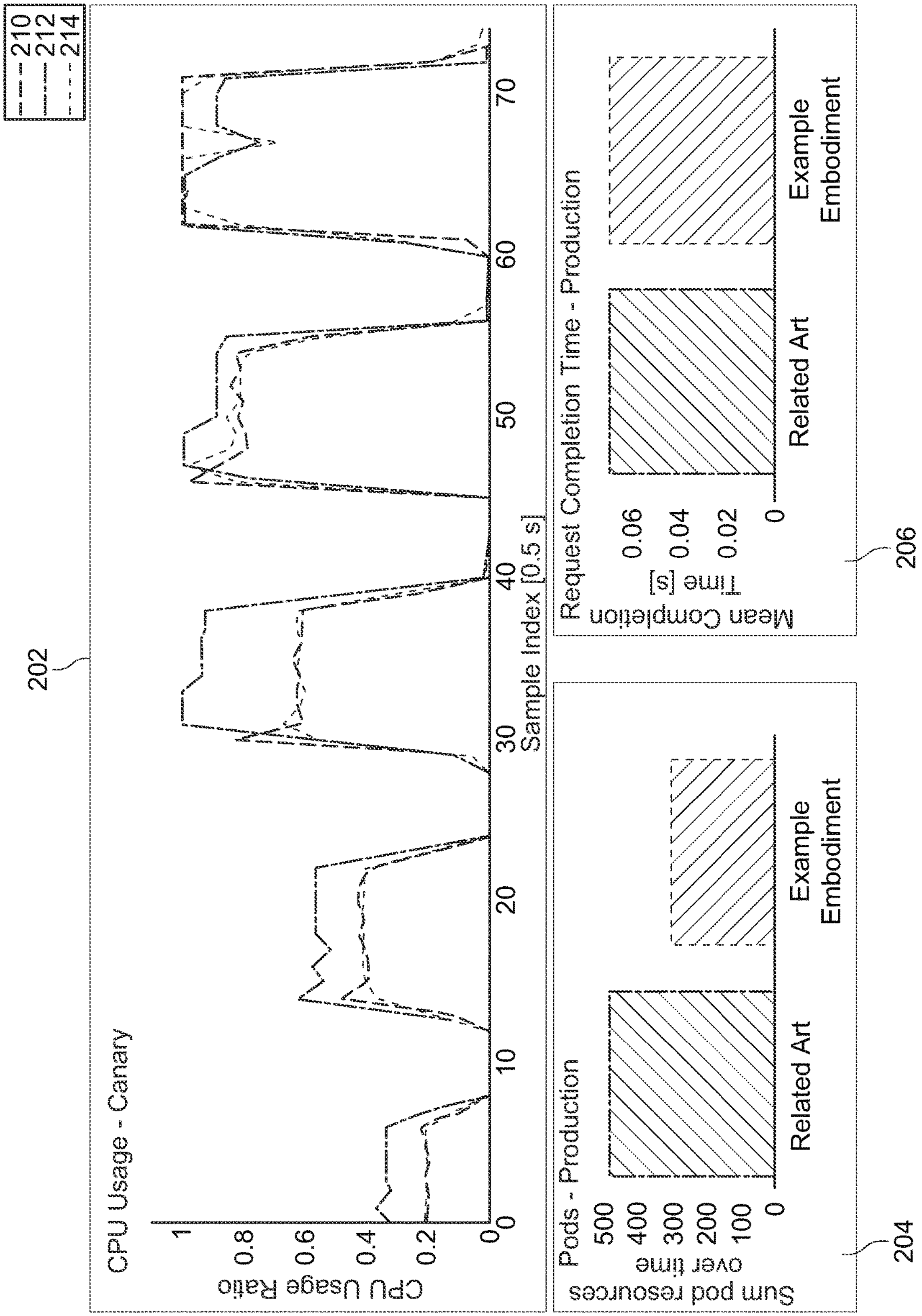
FIG. 2 is a diagram of graphs showing performance of the system, according to an embodiment

FIG. 2 is a diagram of graphs showing performance of the system, according to an embodiment. FIG. 2 shows graph 202 depicting CPU usage in the canary cluster 104, graph 204 showing pod resource consumption in the production cluster 102, and graph 206 showing request completion time in the production cluster 102.

FIG. 2 shows the automatic tuning of the HPA 120 by the HPA controller 110. The depicted use-case is based on a change in the application resource profile. That is, the application running in the production cluster 102 is updated, changing the resource consumption of the requests, and rendering the HPA configuration inefficient. As described above, various factors may render a current HPA configuration inefficient or inadequate.

Thus, the system may perform optimizations in multiple steps. The system may use the canary cluster 104 together with the load generator 130 to generate measurements on the resource consumption of the updated application. The measurements may be collected by the DT 106, where the ML module 142 may learn a new HPA configuration from the obtained data. Graph 202 shows the mismatch between the old HPA configuration (line 210), the actual cluster utilization (line 212), and the new HPA configuration (line 214). The new HPA configuration (line 214) correctly predicts the utilization of resources (e.g., CPU usage).

The HPA controller 110 may implement the simulation (e.g., generated by the simulation generator 108), the behavioral models, and historical data on request patterns from the DT 106 optimize the HPA configuration. The simulation may be initialized with the current configuration of the production cluster 102. The HPA controller 110 may update the parameters that the simulation is configured to evaluate. The simulation generator 108 may indicate the expected QoS and pod resources over time of the cluster to the HPA controller 110. Then, the HPA controller 110 may determine an optimal HPA configuration and utilize the DT 106 to apply the optimal HPA configuration to the production cluster 102. The system may deploy the updated application to the production cluster 102. Graphs 204 shows the resulting QoS and pod resources of the application in the related art implementation versus example embodiments, and graph 206 shows the mean completion time in the related art implementation versus example embodiments. As shown, over the same amount of completion time, the consumption of pod resources over time is reduced.

Figure 3:
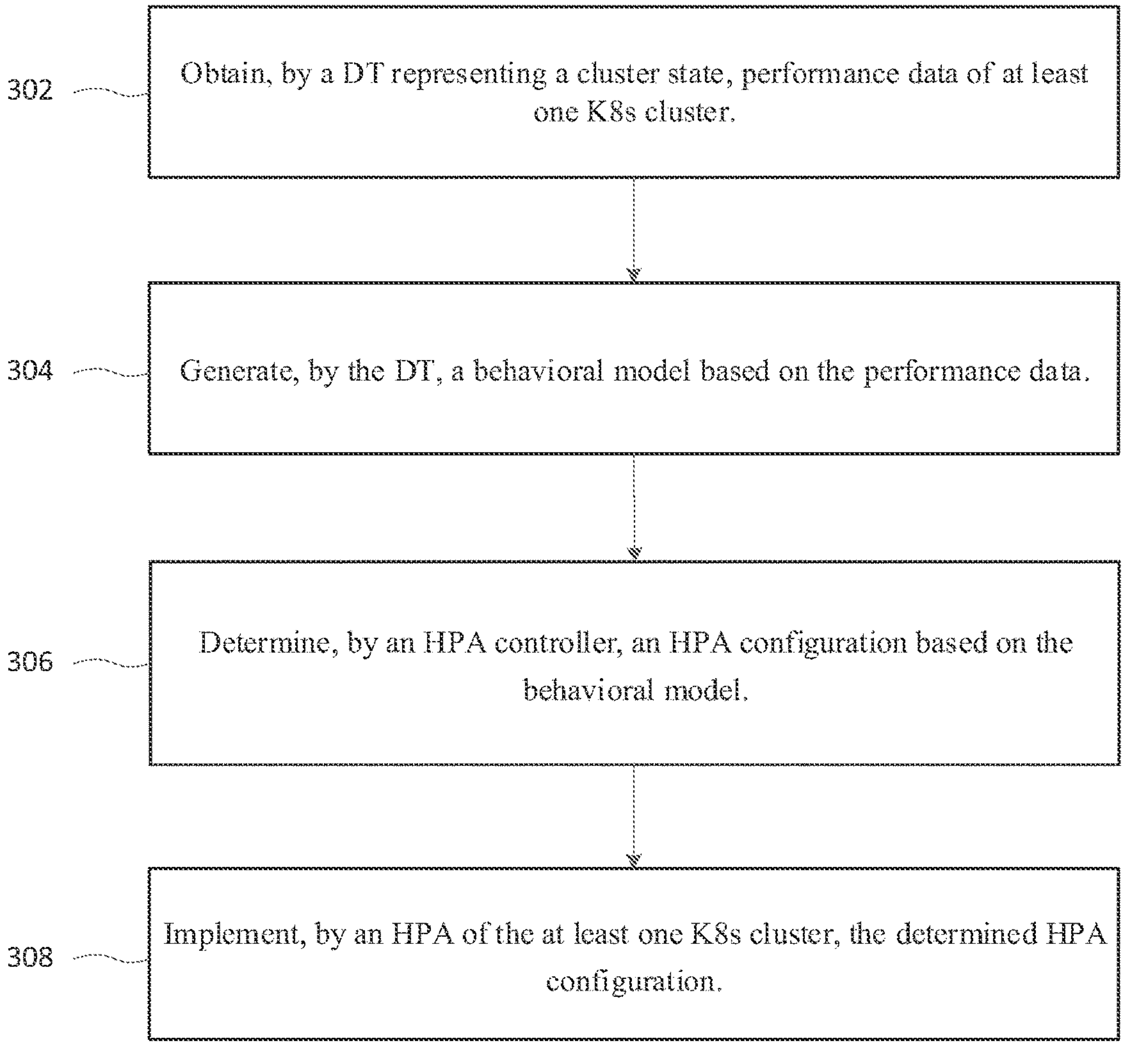
FIG. 3 is a flowchart of a method of workload management in a K8s environment, according to an embodiment.

FIG. 3 is a flowchart of a method of workload management in a K8s environment, according to an embodiment. In operation 302, the system may obtain, by a DT representing a cluster state, performance data of at least one K8s cluster. In operation 304, the system may generate, by the DT, a behavioral model based on the performance data. In operation 306, the system may determine, by an HPA controller, an HPA configuration based on the behavioral model. In operation 308, the system may implement, by an HPA of the at least one K8s cluster, the determined HPA configuration.

According to embodiments, a method of workload management in a K8s environment may include obtaining, by a DT representing a cluster state, performance data of at least one K8s cluster, generating, by the DT, a behavioral model based on the performance data, determining, by a HPA controller, a HPA configuration based on the behavioral model and implementing, by an HPA of the at least one K8s cluster, the determined HPA configuration.

The at least one K8s cluster may include a K8s canary cluster.

The performance data may be obtained from at least one sidecar container of the K8s canary cluster.

The obtaining the performance data may include at least one of obtaining an arrival time, a departure time, or a service time of at least one request from a reverse sidecar proxy of the K8s canary cluster and obtaining a CPU utilization corresponding to at least one request from a measurement sidecar container of the K8s canary cluster.

The at least one K8s cluster may include a K8s production cluster.

The obtaining the performance data may include at least one of obtaining resource utilization information from a K8s cAdvisor, obtaining HPA actions of an HPA of the K8s production cluster and obtaining a deployment time of at least one pod of the K8s production cluster.

The method may be performed in response to detecting a change in a request pattern to the at least one K8s cluster.

The method may be performed in response to a change of an application of the at least one K8s cluster.

According to embodiments, a system for workload management in a K8s environment may include at least one memory storing instructions and at least one processor configured to execute the instructions to obtain, by a DT representing a cluster state, performance data of at least one K8s cluster, generate, by a simulation generator, at least one HPA configuration based on the behavioral model, determine, by a HPA controller, a HPA configuration based on the behavioral model, and implement, by an HPA of the at least one K8s cluster, the determined HPA configuration.

The at least one K8s cluster may include a K8s canary cluster.

The performance data may be obtained from at least one sidecar container of the K8s canary cluster.

The at least one processor may be configured to obtain the performance data by at least one of obtaining an arrival time, a departure time, or a service time of at least one request from a reverse sidecar proxy of the K8s canary cluster and obtaining a CPU utilization corresponding to at least one request from a measurement sidecar container of the K8s canary cluster.

The at least one K8s cluster may include a K8s production cluster.

The at least one processor may be configured to obtain the performance data by at least one of obtaining resource utilization information from a K8s cAdvisor, obtaining HPA actions of an HPA of the K8s production cluster, and obtaining a deployment time of at least one pod of the K8s production cluster.

The at least one processor may be configured to execute the instructions in response to a change in a request pattern to the at least one K8s cluster being detected.

The at least one processor may be configured to execute the instructions in response to a change of an application of the at least one K8s cluster.

According to embodiments, a non-transitory computer-readable storage medium may store instructions that, when executed by at least one processor, cause the at least one processor to obtain, by a DT representing a cluster state, performance data of at least one K8s cluster, generate, by a simulation generator, at least one HPA configuration based on the behavioral model, determine, by a HPA controller, a HPA configuration based on the behavioral model, and implement, by an HPA of the at least one K8s cluster, the determined HPA configuration.

The at least one K8s cluster may include a K8s canary cluster and the instructions, when executed, may cause the at least one processor to obtain the performance data by at least one of obtaining an arrival time, a departure time, or a service time of at least one request from a reverse sidecar proxy of the K8s canary cluster and obtaining a CPU utilization corresponding to at least one request from a measurement sidecar container of the K8s canary cluster.

The at least one K8s cluster may include a K8s production cluster and the instructions, when executed, may cause the at least one processor to obtain the performance data by at least one of obtaining resource utilization information from a K8s cAdvisor, obtaining HPA actions of an HPA of the K8s production cluster and obtaining a deployment time of at least one pod of the K8s production cluster.

The instructions may be executed by the at least one processor in response to at least one of a change in a request pattern to the at least one K8s cluster being detected and a change of an application of the at least one K8s cluster.

Figure 4:
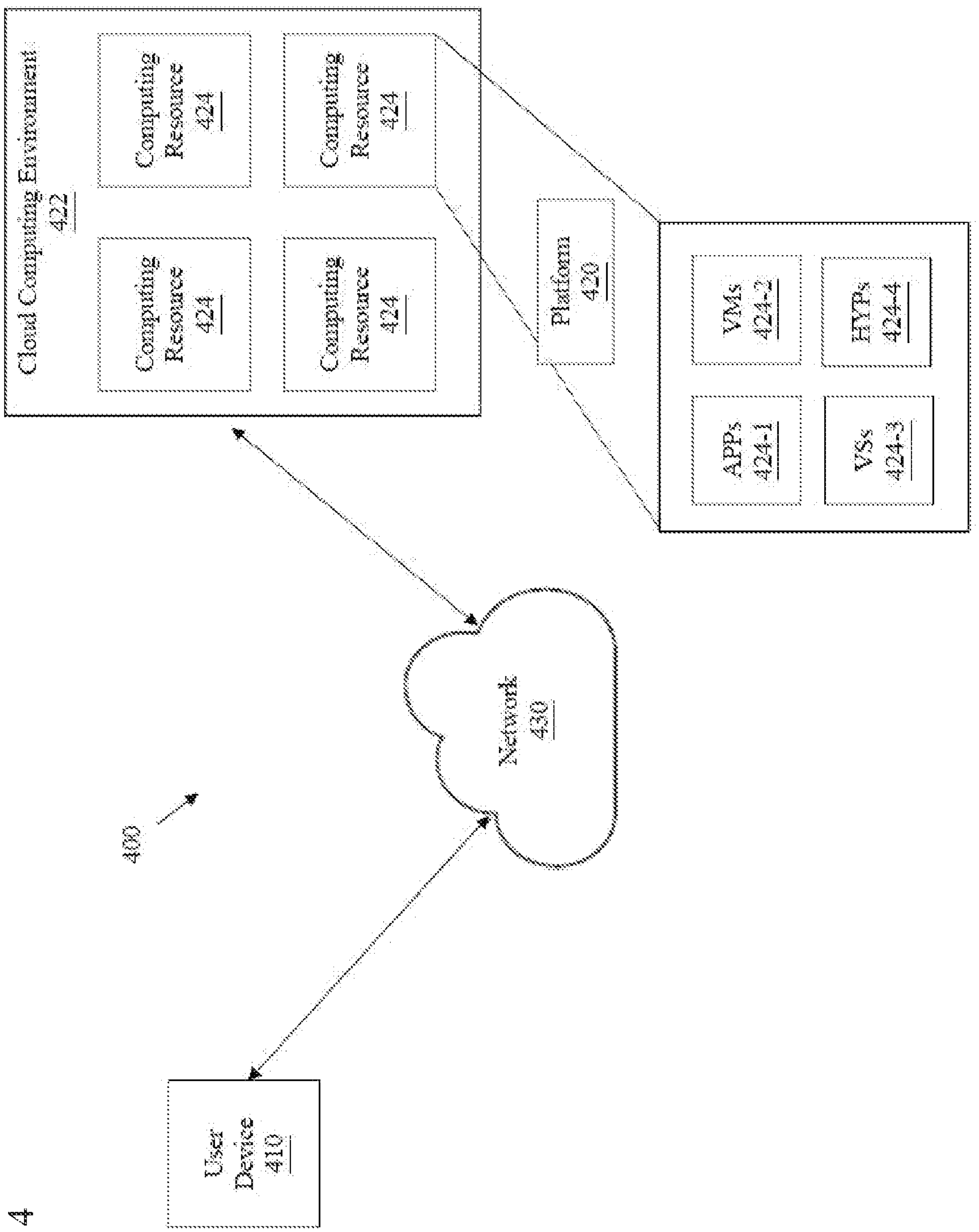
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIG. 1 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc. services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
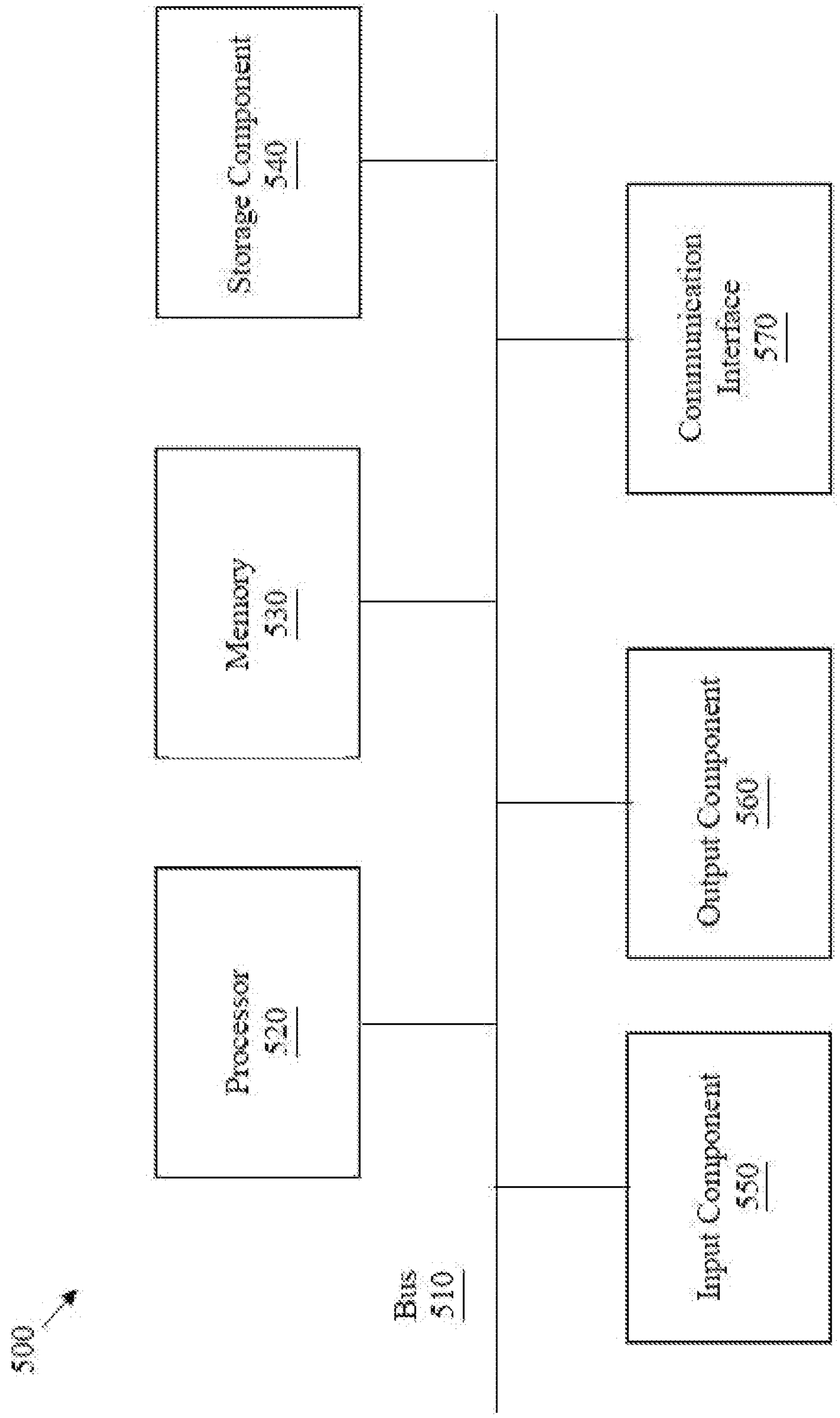
FIG. 5 is a diagram of example components of a device according to an embodiment.

FIG. 5 is a diagram of example components of a device 500. Device 500 may correspond to user device 410 and/or platform 420. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 1, 2 and 3 may be implemented by or using any one of the elements illustrated in FIGS. 4 and 5.

According to example embodiments, a method of workload management may include obtaining performance data from a K8s cluster, generating a behavioral model based on the performance data, determining an optimal HPA configuration based on the behavioral model, and implement the optimal HPA configuration in an HPA of the K8s cluster. Accordingly, the HPA configuration may be dynamically updated to efficiently manage workload changes caused by various changes to the system, such as a change in request arrivals, a change in the application, etc.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of workload management in a Kubernetes (K8s) environment, comprising:

obtaining, by a digital twin (DT) representing a cluster state, performance data of at least one K8s cluster;

generating, by the DT, a behavioral model based on the performance data;

determining, by a horizontal pod autoscaler (HPA) controller, a HPA configuration based on the behavioral model; and implementing, by an HPA of the at least one K8s cluster, the determined HPA configuration;

wherein the digital twin comprises a measurements database configured to store the performance data obtained from a production cluster and a canary cluster, and wherein the performance data comprises at least one of resource utilization information from a K8s cAdvisor, HPA actions of an HPA of the production cluster, and a deployment time of at least one pod of the production cluster.

2. The method of claim 1, wherein the at least one K8s cluster comprises a K8s canary cluster.

3. The method of claim 2, wherein the performance data is obtained from at least one sidecar container of the K8s canary cluster.

4. The method of claim 2, wherein obtaining the performance data comprises at least one of:

obtaining an arrival time, a departure time, or a service time of at least one request from a reverse sidecar proxy of the K8s canary cluster; and obtaining a central processing unit (CPU) utilization corresponding to at least one request from a measurement sidecar container of the K8s canary cluster.

5. The method of claim 1, wherein the at least one K8s cluster comprises a K8s production cluster.

6. The method of claim 5, wherein obtaining the performance data comprises at least one of:

obtaining resource utilization information from the K8s cAdvisor;

obtaining HPA actions of the HPA of the K8s production cluster; and obtaining a deployment time of at least one pod of the K8s production cluster.

7. The method of claim 1, wherein the method is performed in response to detecting a change in a request pattern to the at least one K8s cluster.

8. The method of claim 1, wherein the method is performed in response to a change of an application of the at least one K8s cluster.

9. A system for workload management in a Kubernetes (K8s) environment, comprising:

at least one memory storing instructions; and at least one processor configured to execute the instructions to:

obtain, by a digital twin (DT) representing a cluster state, performance data of at least one K8s cluster;

generate, by a simulation generator, at least one horizontal pod autoscaler (HPA) configuration based on a behavioral model;

determine, by a HPA controller, a HPA configuration based on the behavioral model; and implement, by an HPA of the at least one K8s cluster, the determined HPA configuration, wherein the digital twin comprises a measurements database configured to store the performance data obtained from a production cluster and a canary cluster, and wherein the performance data comprises at least one of resource utilization information from a K8s cAdvisor, HPA actions of an HPA of the production cluster, and a deployment time of at least one pod of the production cluster.

10. The system of claim 9, wherein the at least one K8s cluster comprises a K8s canary cluster.

11. The system of claim 10, wherein the performance data is obtained from at least one sidecar container of the K8s canary cluster.

12. The system of claim 10, wherein the at least one processor is configured to obtain the performance data by at least one of:

obtaining an arrival time, a departure time, or a service time of at least one request from a reverse sidecar proxy of the K8s canary cluster; and obtaining a central processing unit (CPU) utilization corresponding to at least one request from a measurement sidecar container of the K8s canary cluster.

13. The system of claim 9, wherein the at least one K8s cluster comprises a K8s production cluster.

14. The system of claim 13, wherein the at least one processor is configured to obtain the performance data by at least one of:

obtaining resource utilization information from the K8s cAdvisor;

obtaining HPA actions of the HPA of the K8s production cluster; and obtaining a deployment time of at least one pod of the K8s production cluster.

15. The system of claim 9, wherein the at least one processor is configured to execute the instructions in response to a change in a request pattern to the at least one K8s cluster being detected.

16. The system of claim 9, wherein the at least one processor is configured to execute the instructions in response to a change of an application of the at least one K8s cluster.

17. A non-transitory computer-readable storage medium storing instructions that, when executed by at least one processor, cause the at least one processor to:

obtain, by a digital twin (DT) representing a cluster state, performance data of at least one Kubernetes (K8s) cluster;

generate, by the DT, a behavioral model based on the performance data;

determine, by a horizontal pod autoscaler (HPA) controller, a HPA configuration based on the behavioral model; and implement, by an HPA of the at least one K8s cluster, the determined HPA configuration, wherein the digital twin comprises a measurements database configured to store the performance data obtained from a production cluster and a canary cluster, and wherein the performance data comprises at least one of resource utilization information from a K8s cAdvisor, HPA actions of an HPA of the production cluster, and a deployment time of at least one pod of the production cluster.

18. The storage medium of claim 17, wherein the at least one K8s cluster comprises a K8s canary cluster, and wherein the instructions, when executed, cause the at least one processor to obtain the performance data by at least one of:

obtaining an arrival time, a departure time, or a service time of at least one request from a reverse sidecar proxy of the K8s canary cluster; and obtaining a central processing unit (CPU) utilization corresponding to at least one request from a measurement sidecar container of the K8s canary cluster.

19. The storage medium of claim 17, wherein the at least one K8s cluster comprises a K8s production cluster, and wherein the instructions, when executed, cause the at least one processor to obtain the performance data by at least one of:

obtaining resource utilization information from the K8s cAdvisor;

obtaining HPA actions of the HPA of the K8s production cluster; and obtaining a deployment time of at least one pod of the K8s production cluster.

20. The storage medium of claim 17, wherein the instructions are executed by the at least one processor in response to at least one of:

a change in a request pattern to the at least one K8s cluster being detected, and a change of an application of the at least one K8s cluster.

* * * * *